United States Patent [19]

Miller et al.

[11] 4,262,586

[45] Apr. 21, 1981

[54] BAKING APPARATUS

[75] Inventors: Dye O. Miller, South Barrington; Ronald Godsen, Lombard, both of Ill.

[73] Assignee: A. J. Antunes & Co., Addison, Ill.

[21] Appl. No.: 65,417

[22] Filed: Aug. 10, 1979

[51] Int. Cl.³ .............................................. A47J 37/00
[52] U.S. Cl. ..................................... 99/345; 99/341; 99/352; 99/355; 99/443 C; 99/448; 99/450; 99/494; 118/25; 198/796
[58] Field of Search ................. 99/352, 355, 356, 386, 99/341, 427, 443 C, 448, 450, 345, 494; 222/196; 118/25, 708, 710, 711; 198/796

[56] References Cited

U.S. PATENT DOCUMENTS

| | | | |
|---|---|---|---|
| 1,776,501 | 9/1930 | Grady | 99/427 |
| 2,858,763 | 11/1958 | Bloom | 99/427 |
| 2,867,163 | 1/1959 | Bloom | 99/386 |
| 3,026,824 | 3/1962 | Reach | 99/352 |
| 3,935,807 | 2/1976 | Main | 99/352 |

*Primary Examiner*—Billy J. Wilhite
*Attorney, Agent, or Firm*—Mason, Kolehmainen, Rathburn & Wyss

[57] ABSTRACT

An economical, energy-saving apparatus for baking food products such as pretzels and the like includes an enclosed housing with an inlet for the introduction of the product to be baked and a door covering the inlet. The apparatus further includes an outlet for removal of the baked product, and a heating assembly for baking the product. Also included in the apparatus of the present invention is a conveyor system for conveying the product from the inlet through the heating assembly to the outlet. To remove the product from the conveying assembly, a removal apparatus is included within the housing for engaging the conveying assembly and removing the product therefrom. Also included in the apparatus of the present invention is a material dispenser for dispensing salt or similar material onto the product to be baked. The material dispenser is defined by a container that is in abutting engagement with the conveyor assembly so as to be engaged thereby resulting in the container being shook to dispense the material. A lift mechanism is also provided on the apparatus of the present invention for lifting the material container out of engagement with the conveyor assembly.

13 Claims, 9 Drawing Figures

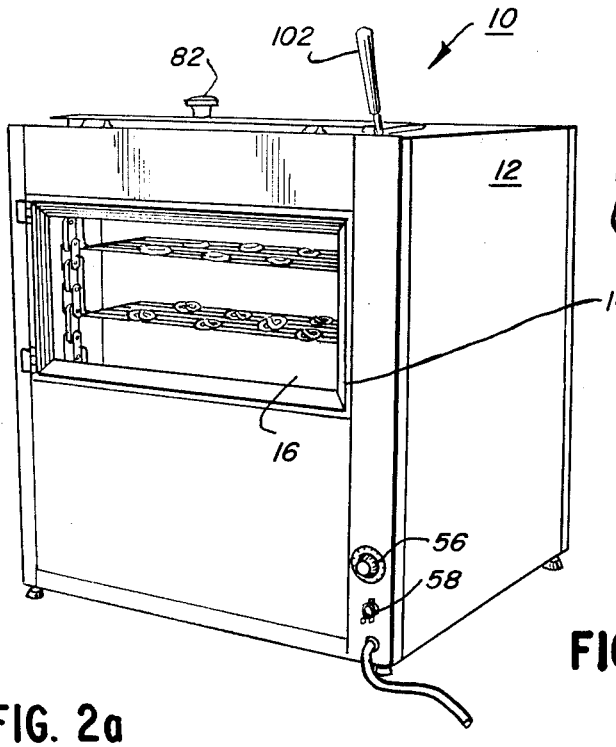
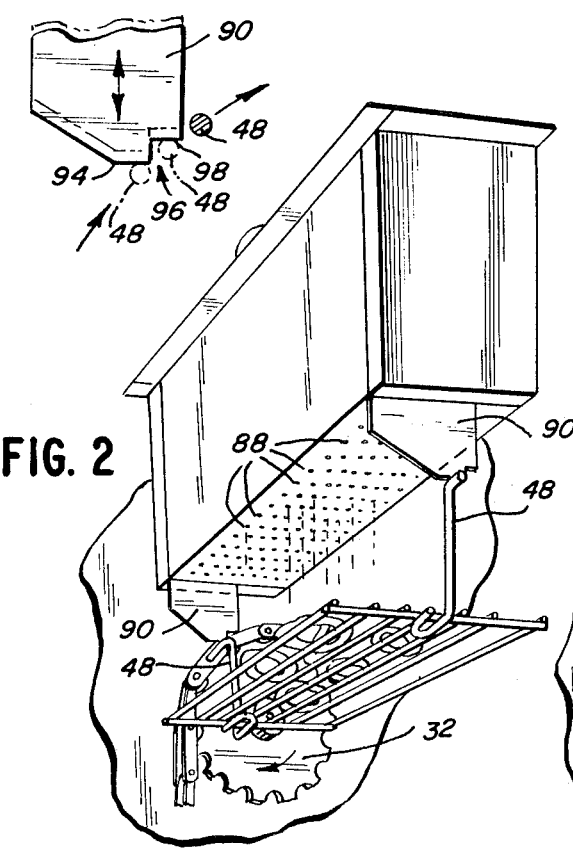
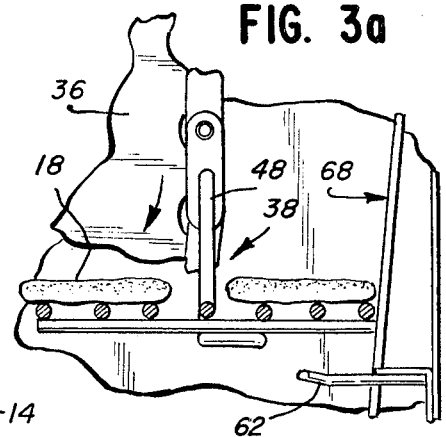
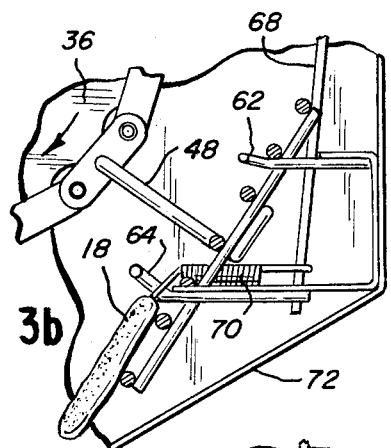
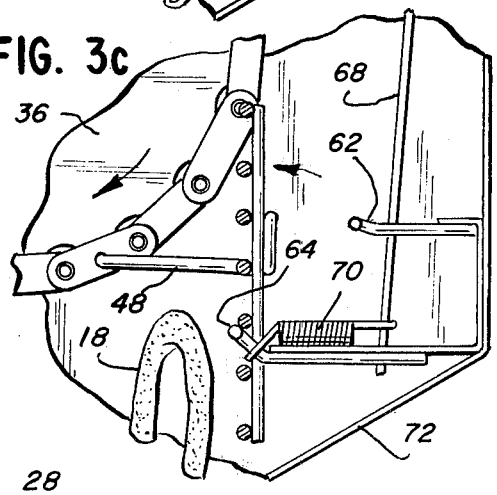
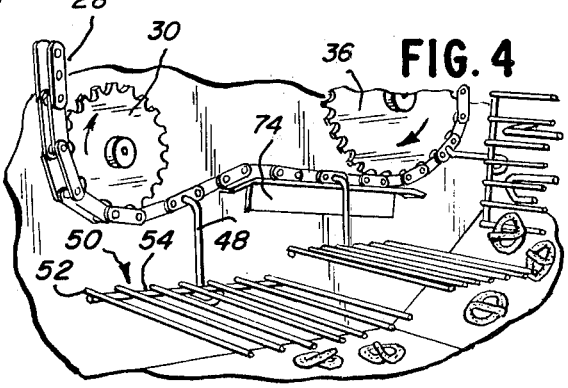

BAKING APPARATUS

BACKGROUND OF THE INVENTION

A. Field of the Invention

The present invention relates to a new and improved economical energy saving apparatus for baking food products such as pretzels and the like.

B. Description of the Prior Art

Typical prior art devices for baking food products such as pretzels and the like are large in size due to the number of operations performed on the product. Typically, these prior art devices are open in the front to allow the operator to load the food products into the apparatus to be baked and to remove them after baking. Consequently, large amounts of heat escape from the apparatus resulting in a waste of energy.

In addition, during baking products such as pretzels and the like, salt must be added to the product, thus requiring a container of salt and some mechanism to dispense the salt onto the product. Prior art methods of accomplishing this procedure are to allow continuous dispensing of salt thus resulting in a waste of a large amount of salt or to provide intermittent vibration of the container of salt thus resulting in an inadequate amount of salt or no salt at all on the product which is undesirable. Another problem with the prior art device is removal of the baked product from the assembly that conveys the product through the apparatus and through the various stages of baking, salting and the like. This procedure is often difficult requiring manual removal upon occasion.

SUMMARY OF THE INVENTION

An object of the present invention is to provide a new and improved economical, energy-saving apparatus for baking food products such as pretzels and the like.

Another object of the present invention is to provide a new and improved apparatus for baking pretzels and the like.

A further object of the present invention is to provide a new and improved apparatus for baking food products such as pretzels and the like that includes a dispenser for dispensing salt in the proper quantities at the proper time.

Still another object of the present invention is to provide a new and improved apparatus for baking food products such as pretzels and the like that includes a device for removing the product after baking.

The present invention is directed to a new and improved apparatus for baking food products such as pretzels and the like defined by an enclosed housing including an inlet for introduction of the product into the apparatus. A door is mounted on the inlet and is to be maintained in the closed position after the product has been placed within the apparatus.

A heating assembly is also included within the housing of the apparatus for baking the product as is an outlet through which the baked product is removed. A conveying system for conveying the product from the inlet through the heating assembly to the outlet is also included.

A material dispenser is movably defined within the housing for dispensing material such as salt onto the product to be baked. The material dispenser is defined by a housing including surfaces for engaging the conveying system such that upon abuttment with the surface of the conveying system, the material dispenser is shook or moved causing dispensing of the material onto the product. The apparatus also includes a mechanism for removing the baked product from the conveying system at the conclusion of the baking operation.

BRIEF DESCRIPTION OF THE DRAWINGS

The above and other objects and advantages and novel features of the present invention will become apparent from the following detailed description of a preferred embodiment of the invention illustrated in the accompanying drawings wherein:

FIG. 1 is a perspective view of a preferred embodiment of a baking apparatus constructed in accordance with the principles of the present invention;

FIG. 2 is a bottom plan view of a salt dispenser included in the apparatus of the present invention illustrating dispensing of salt onto the product being baked;

FIG. 2a is an enlarged fragmentary view of a portion of the salt dispenser illustrating the movement of the dispenser as engaged by the conveyor of the device of the present invention;

FIG. 3a is an enlarged fragmentary view of the conveyor and the product removal structure prior to removal of the product;

FIG. 3b is a view similar to 3a illustrating the commencement of the removal of the product from the conveyor;

FIG. 3c is a view similar to FIGS. 3a and 3b illustrating the final stages of removal of the product from the conveyor;

FIG. 4 is an enlarged partial view of the conveyor included in the apparatus of the present invention after removal of the product;

DESCRIPTION OF THE PREFERRED EMBODIMENT

Figure 6:
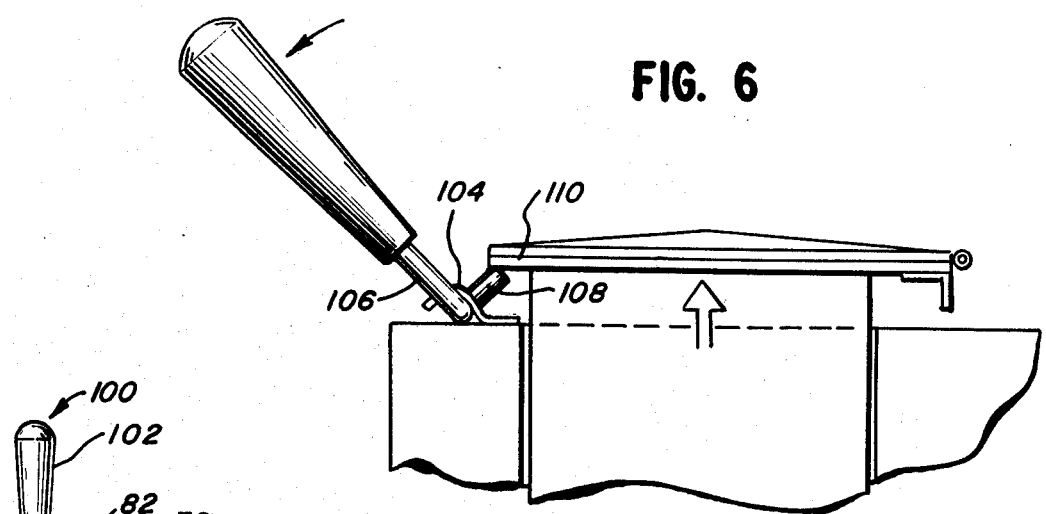
FIG. 6 is an enlarged view of a portion of the salt dispenser included in the device of the present invention.

Referring now to the drawings and initially to FIG. 1, there is illustrated an apparatus generally designated by the reference numeral 10 for baking food products such as pretzels and the like. The apparatus 10 is defined by an enclosed housing 12 including a product inlet 14 that is covered in the preferred embodiment by a glass door 16. The inlet 14 allows the introduction of the product such as a pretzel 18 or the like into the interior of the housing 12 or the baking chamber 19 (FIG. 5) within which the product 18 is to be baked.

In order to bake the product 18, resistive heating elements 20 are mounted in the upper portion of the interior 22 of the housing 12 to take advantage of the fact that heat rises. Defined in the lower portion of the housing 12 is a drawer 24 that may be opened by the operator of the apparatus 12 to remove the baked product 18.

To convey the product through the inlet 14, adjacent to the heating elements 20 to be baked and then to the drawer 24, a conveyor system generally designated by the reference numeral 26 is provided in the apparatus 10. The conveyor system 26 includes a pair of link chains 28 that extend in a continuous circuit around idler sprockets 30, 32 and 34 and a driver sprocket 36 that is connected to a motor (not shown) to drive the chains 28 in the continuous circuit. Intermittently spaced and attached to the chains 28 are individual product baskets generally designated by the reference numeral 38. The product baskets 38 include a pair of bails 48 that are each pivotally secured to one of the chain links 28 allowing the product baskets 38 to pivot relative to the chain 28 as it passes through the circuit defined thereby. Extending between the bails 48 is a tray 50 defined by a plurality of parallel rods 52 rigidly secured to transverse rods 54. The bails 48 are rigidly secured to the transverse rods 54.

To commence baking, the operator of the cooking apparatus 10 opens the door 16 and loads a product basket with food products such as frozen pretzels 18. Thereafter, the thermostatic control 56 may be adjusted to the desired temperature level and the apparatus 10 energized by actuation of the switch button 58. The actuation of the switch button 58 energizes the resistive heating elements 20 and the motor that rotates the driven sprocket 36. As this occurs the chains 28 are moved through the circuit moving each loaded product basket 38 upward and over the idler sprocket 32 and between the heating elements 20 whereupon the product 18 is baked. After passing through the heating chamber 19 as defined by the reflection assembly 60, the chains 28 and the product basket 38 pass over the idler sprocket 34 and move downwardly toward the drawer 24. Since the product 18 has now been baked, it is desirable to unload the product 18 from the product basket 38 and return the product basket 38 to the inlet 14 for more products 18 to be placed on the basket 38.

To accomplish the removal of the product 18 from the basket 38, bails 62 and 64 are mounted onto the housing 12 and extend toward the driven sprocket 36. As each product basket 38 approaches the bails 62 and 64, the outer edges thereof engage a first alignment guide 66 and a second resiliently biased alignment guide 68. The alignment guide 68, in the preferred embodiment, may be in the form of a wire that is biased by the spring 70 at its lower end in a direction toward the driven sprocket 36. The upper end of the guide 68 is secured to the housing 12. As the product basket moves downwardly toward the bails 62 and 64, the guide wire 68 engages one outer edge of the basket 38 moving the other edge into engagement with the guide 66 thereby maintaining the basket 38 in a horizontal position (see for example, FIG. 3a).

As the product basket 38 continues downwardly, the first bail 62 extends between the rods 52 causing pivoting of the basket 38 relative to the chain 28. Pivoting and further downward movement of the basket 38 results in the other end of the product basket 38 moving into and over the second bail 64, best illustrated in FIG. 3b. As this occurs, the spring biased guide wire 68 interacts with the one outer edge of the product basket 38 causing further pivoting of the product basket 38 under the influence of the biasing spring 70. This pivoting action plus the engagement of the bails 62 and 64 with product 18 causes the product 18 to be pushed by the bails 62 and 64 and pulled by gravity away from the product basket 38 and onto a slanted portion 72 of the housing 12 leading into the drawer 24. Continued movement of the chains 28 through their circuits results in complete pivoting of the food basket 38 to the vertical position illustrated in FIG. 3c removing one side of the product basket 38 from the bail 62 and insuring complete removal of any product 18 in the basket 38.

Further movement of the chains 28 result in sliding of the product basket 38 off of the second bail 64 thus freeing the product basket 38 from the product removal structure defined by the bails 62 and 64. Thereafter, the chains 28 engage a guide ramp 74 that lifts the product basket 38 over the drawer 24 to avoid engagement therewith returning the product basket 38 to the inlet door 16 whereupon additional products may be added.

In baking pretzels 18 and the like, it is desirable to salt the product 18 before baking. Since the pretzels 18 are frozen while being placed on the product basket 38, the heat within the housing 12 is sufficient to cause moisture to occur on the outer peripheral surface of the pretzel 18. Thereafter, if salt is applied, it will stick to the outer surface throughout the baking process. Accordingly, in this condition, it is desirable to dispense salt onto the pretzel 18 while it is in this moist or wet state and thus a material or salt dispenser generally designated by the reference numeral 76 is provided in the apparatus 10.

More specifically, the salt dispenser 76 includes a container 78 with a removable top 80 that includes a handle 82 for easy removal to introduce salt 84 into the container 78. The container 78 is positioned within an open bottomed recess 86 defined in the housing 12. The container 78 includes a plurality of apertures 88 (FIG. 2) through which the salt 84 is dispensed. In order for the salt 84 to be dispensed, however, shaking or movement of the container 78 is necessary. Shaking of the container 78 is accomplished by an engagement member 90 secured to the container 78 by fasteners 92.

Specifically, as best illustrated in FIG. 2a, the engagement member 90 includes a first horizontal surface 94 and a stepped portion 96 including a second horizontal surface 98. With reference to FIGS. 2 and 2a, it is seen that the engagement member 90 is positioned within the housing 12 so the horizontal surfaces 94 and 98 are engaged by the bails 48 as the product basket 38 passes beneath the salt container 78 resulting in the bail 48 first engaging the surface 94 resulting in lifting of the container 78. As the product basket continues along its circuit defined by the conveyor structure 26, the bail 48 passes beyond the surface 94 and the container 78 then falls downwardly until the surface 98 engages the bail 48. The container 78 is again lifted as the bail 48 continues its movement over the sprocket 32. Once the bail 48 passes beyond the surface 98, the container 78 is again released dropping downward relative to housing 12 and engaging the bottom of the recess 86. This shaking or movement of the container 78 results in dispensing salt 84 through the apertures 88 onto the product or pretzel 18 positioned beneath the container 78 on the product basket 38, thus providing the proper amount of salt to be dispensed at the proper point in time during the operation of the apparatus 10.

Figure 5:
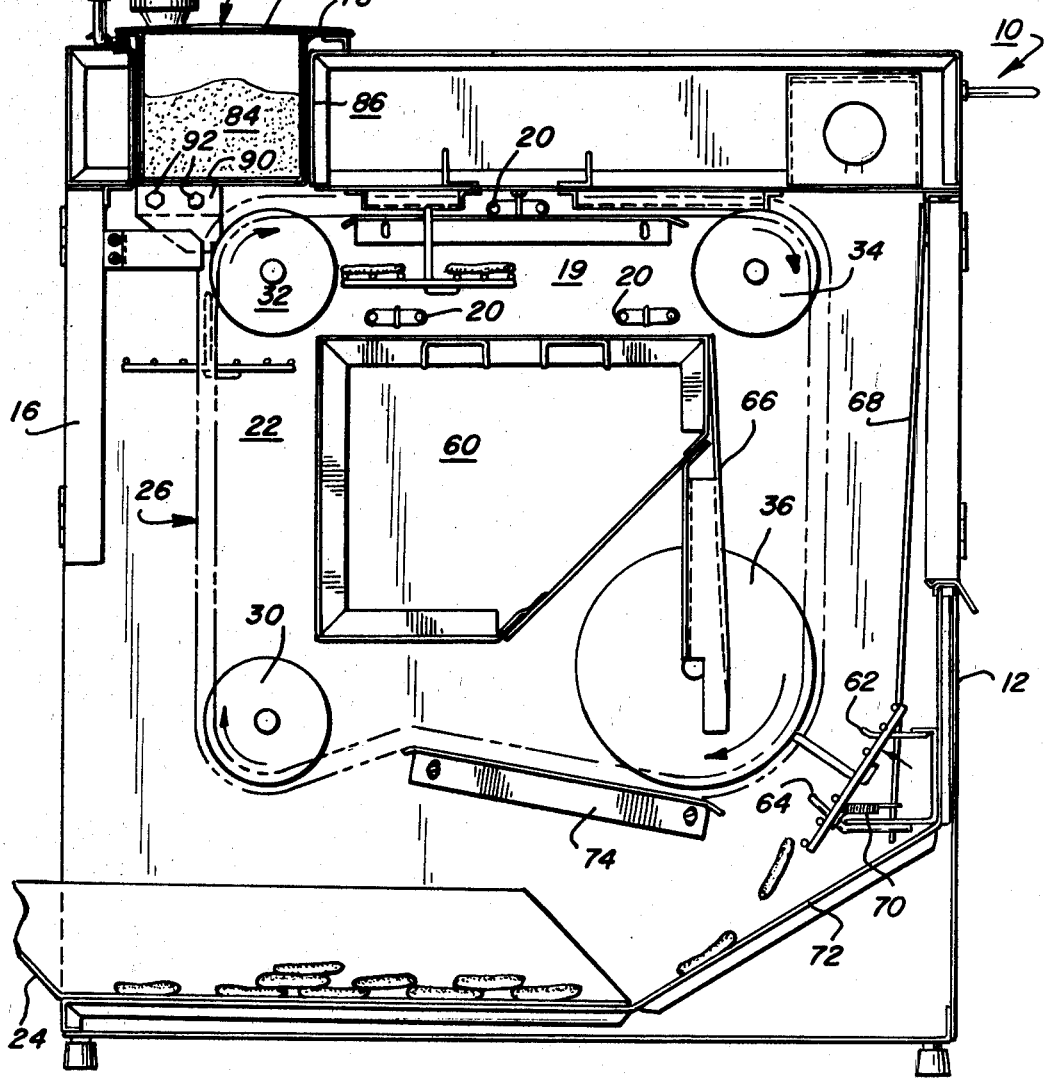
FIG. 5 is an enlarged vertical cross sectional view of the apparatus of the present invention.

If a product is being baked within the apparatus 10 and it is not desired that the product be salted, the container 78 may be moved upwardly in the recess 86 through the employment of the lift assembly 100. The lift assembly 100 includes a handle 102 and a leg 106 held by a strap 104 to the housing 12. The leg 106 further includes an extension 108 that extends beneath a lip 110 defined on the container 78 (FIG. 6). As illustrated in FIG. 5, if it is desired that salt 84 be dispensed, the lift assembly 100 is in the vertical position allowing the engagement member 90 to extend to a position to be engaged by the bails 48. If a product is being baked on which no salt is desired, the lift assembly 100 can be moved to the position illustrated in FIG. 6 wherein the handle 102 is moved away from a vertical position tilting the extension 108 upwardly and elevating the container 78 through the engagement with the lip 110 to a position wherein the engagement member 90 no longer is engaged by the bails 48 and salt 84 is no longer dispensed.

Many modifications and variations of the present invention are possible in light of the above teachings. Thus, it is to be understood that, within the scope of the appended claims, the invention may be practiced other than as specifically described above.

What is claimed and desired to be secured by Letters Patent of the United States is:

1. An apparatus for baking food products comprising
  a housing
  means for conveying said product through said housing,
  means for baking said product, and
  means for dispensing material onto said product, said dispensing means including a material container moveably mounted in said housing, said container further including an engagement member for engaging said conveying means to shake said container.

2. The apparatus claimed in claim 1 further comprising means for lifting said container and said engagement member out of engagement with said conveying means.

3. The apparatus claimed in claim 2 wherein said lifting means comprises a rod pivotally mounted on said housing engaging said container and a handle on said rod.

4. The apparatus claimed in claim 1 wherein said engagement member is of a stepped configuration including first and second engagement surfaces.

5. An apparatus for baking food products comprising:
  a housing with a product inlet and outlet,
  means for baking said products,
  conveying means for conveying said products from said inlet, through said baking means to said outlet, said conveying means including a plurality of supports each having a support surface upon which said products are positioned, and
  means for removing said products from said conveying means, said removing means including a conveying means engagement member arranged to penetrate said support surfaces to disengage said food products therefrom.

6. The apparatus claimed in claim 5 wherein said conveying means includes pivotally mounted product supports.

7. The apparatus claimed in claim 6 wherein said engagement member engages and pivots said product supports.

8. The apparatus claimed in claim 5 further comprising alignment means for aligning said conveying means prior to engagement with said engagement member.

9. The apparatus claimed in claim 8 wherein said alignment means includes a wire secured to said housing and means for biasing said wire into engagement with said conveying means.

10. The apparatus of claim 5 wherein said supports are grills.

11. A baking apparatus for baking products comprising:
  and enclosed housing;
  a product inlet defined in said housing;
  means for heating said product;
  means for conveying said product from said product inlet, through said heating means to said product outlet; and
  means for dispensing material onto said product, said dispensing means including a container for said material removably mounted on said apparatus, said container including at least one material outlet, said container further including at least one engagement surface means for engaging said conveying means to move said container relative to said housing to shake said material through said material outlet.

12. The apparatus set forth in claim 11 further comprising means for moving said container to move said engagement surface means out of engagement with said conveying means.

13. An apparatus for baking food products comprising:
  a housing with a product inlet and outlet;
  means for heating said products;
  a conveying means for conveying said products from said inlet, through said heating means to said outlet;
  means for removing said products from said conveying means, said removing means including a conveying means engagement member, and
  alignment means for aligning said conveying means prior to engagement with said engagement member, said alignment means including a wire secured to said housing and means for biasing said wire into engagement with said conveying means.

* * * * *